United States Patent
Roberts et al.

(10) Patent No.: US 10,051,540 B2
(45) Date of Patent: *Aug. 14, 2018

(54) METHOD, TERMINAL, AND SYSTEM FOR CELL RESELECTION

(71) Applicant: Huawei Technologies Co., Ltd., Shenzhen (CN)

(72) Inventors: Michael Roberts, Stockholm (SE); Johan Johansson, Stockholm (SE); Boyun Xie, Xi'an (CN); Min Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,852

(22) Filed: Jan. 25, 2016

(65) Prior Publication Data

US 2016/0286453 A1    Sep. 29, 2016

Related U.S. Application Data

(63) Continuation of application No. 14/671,842, filed on Mar. 27, 2015, now Pat. No. 9,247,493, which is a (Continued)

(30) Foreign Application Priority Data

Apr. 9, 2008 (CN) .......................... 2008 1 0091957

(51) Int. Cl.
*H04W 36/00* (2009.01)
*H04W 36/24* (2009.01)
*H04W 48/18* (2009.01)

(52) U.S. Cl.
CPC ....... *H04W 36/24* (2013.01); *H04W 36/0055* (2013.01); *H04W 36/0061* (2013.01); *H04W 48/18* (2013.01)

(58) Field of Classification Search
CPC . H04W 36/0055; H04W 48/18; H04W 36/00; H04W 48/20; H04W 36/30;
(Continued)

(56) References Cited

U.S. PATENT DOCUMENTS 7,729,315 B2   6/2010  Lindoff et al.
8,041,355 B2  10/2011  Roberts et al.
(Continued)

FOREIGN PATENT DOCUMENTS

CN   1675957 A   9/2005
CN   1832601 A   9/2006
(Continued)

OTHER PUBLICATIONS

"The '003 Patent; Samsung's Local Patent Rule 3-3 and 3-4 Disclosures," Case No. 16-cv-02787-WHO, pp. 113-124 (Published no later than Apr. 18, 2017).

(Continued)

*Primary Examiner* — Mahendra Patel
(74) *Attorney, Agent, or Firm* — Leydig, Voit & Mayer, Ltd.

(57) ABSTRACT

A method and terminal are disclosed for cell reselection. In the disclosure, the terminal obtains a dedicated priority list and a valid time of the dedicates priority list for cell reselection from a first communication system, such as a Long Term Evolution (LTE) system, when the terminal is in a cell of the fists communication system. In case that the the terminal camps on a cell of a second communication system, such as a non-LTE system (for example, a UMTS system), and before the valid time expire, the terminal performs cell reselection using the dedicated priority list.

25 Claims, 3 Drawing Sheets

Related U.S. Application Data continuation of application No. 14/135,045, filed on Dec. 19, 2013, now Pat. No. 8,996,003, which is a continuation of application No. 13/672,494, filed on Nov. 8, 2012, now Pat. No. 8,639,246, which is a continuation of application No. 12/902,933, filed on Oct. 12, 2010, now Pat. No. 8,412,197, which is a continuation of application No. PCT/CN2009/071194, filed on Apr. 8, 2009.

(58) Field of Classification Search
CPC ..... H04W 88/06; H04W 48/16; H04W 48/08; H04W 80/00; H04W 60/00; H04W 36/14; H04W 76/022; H04J 11/0093; H04Q 7/00; H04Q 7/20; H04Q 7/38; H04L 12/26; H04B 7/00
USPC ......... 455/435.3, 436, 449, 452.1, 434, 510, 455/437; 370/252, 312, 230
See application file for complete search history.

(56) References Cited

U.S. PATENT DOCUMENTS

| | | | |
|---|---|---|---|
| 8,064,403 B2 | 11/2011 | Zhao et al. | |
| 8,185,111 B2 | 5/2012 | Roberts et al. | |
| 8,270,991 B2 | 9/2012 | Zhao | |
| 8,359,033 B2 | 1/2013 | Diachina et al. | |
| 8,412,197 B2 | 4/2013 | Roberts et al. | |
| 8,639,246 B2 | 1/2014 | Roberts et al. | |
| 8,996,003 B2 | 3/2015 | Roberts et al. | |
| 9,258,769 B2 | 2/2016 | Ore et al. | |
| 2001/0011019 A1* | 8/2001 | Jokimies | H04W 48/20 455/449 |
| 2004/0058679 A1* | 3/2004 | Dillinger | H04W 48/16 455/439 |
| 2004/0121777 A1 | 6/2004 | Schwarz et al. | |
| 2004/0121781 A1* | 6/2004 | Sammarco | H04W 24/00 455/456.1 |
| 2004/0162074 A1* | 8/2004 | Chen | H04W 36/04 455/437 |
| 2005/0048982 A1* | 3/2005 | Roland | H04W 48/16 455/449 |
| 2005/0079870 A1* | 4/2005 | Rick | H04W 60/04 455/437 |
| 2005/0176468 A1* | 8/2005 | Iacono | H04B 7/0689 455/562.1 |
| 2006/0251023 A1* | 11/2006 | Choi | H04W 36/30 370/331 |
| 2006/0258350 A1* | 11/2006 | Roy | H04W 36/0061 455/435.1 |
| 2006/0258386 A1 | 11/2006 | Jeong et al. | |
| 2007/0189241 A1 | 8/2007 | Zhang | |
| 2007/0191006 A1* | 8/2007 | Carpenter | H04W 48/16 455/435.2 |
| 2007/0224988 A1 | 9/2007 | Shaheen | |
| 2007/0258410 A1 | 11/2007 | Huang et al. | |
| 2007/0287459 A1 | 12/2007 | Diachina et al. | |
| 2008/0014957 A1 | 1/2008 | Ore | |
| 2008/0045262 A1* | 2/2008 | Phan | H04W 36/0083 455/525 |
| 2008/0085710 A1 | 4/2008 | Prateek | |
| 2008/0102896 A1 | 5/2008 | Wang et al. | |
| 2008/0108353 A1 | 5/2008 | Lee et al. | |
| 2008/0130578 A1* | 6/2008 | Wang | H04W 48/10 370/331 |
| 2008/0167041 A1 | 7/2008 | Wang et al. | |
| 2008/0176565 A1* | 7/2008 | Eerolainen | H04W 48/16 455/436 |
| 2008/0238843 A1 | 10/2008 | Ore et al. | |
| 2008/0268843 A1* | 10/2008 | Ore | H04W 36/0061 455/435.3 |
| 2009/0042576 A1* | 2/2009 | Mukherjee | H04J 11/0093 455/436 |
| 2009/0047957 A1 | 2/2009 | Westerberg | |
| 2009/0088159 A1 | 4/2009 | Wu et al. | |
| 2009/0181676 A1* | 7/2009 | Lee | H04J 11/0093 455/436 |
| 2009/0238117 A1* | 9/2009 | Somasundaram | H04J 11/0093 370/328 |
| 2010/0093350 A1* | 4/2010 | Wang | H04J 11/0093 455/436 |
| 2010/0216468 A1* | 8/2010 | Kazmi | H04W 48/20 455/435.3 |
| 2010/0222055 A1* | 9/2010 | Cho | H04J 11/0086 455/434 |
| 2010/0255849 A1* | 10/2010 | Ore | H04W 28/18 455/450 |
| 2011/0034169 A1* | 2/2011 | Roberts | H04W 36/0055 455/435.3 |
| 2011/0058480 A1 | 3/2011 | Dahlen | |
| 2011/0105153 A1 | 5/2011 | Miklos et al. | |
| 2013/0065593 A1 | 3/2013 | Roberts et al. | |

FOREIGN PATENT DOCUMENTS

| | | | |
|---|---|---|---|
| CN | 1852559 A | 10/2006 | |
| CN | 1852599 A | 10/2006 | |
| CN | 1965605 A | 5/2007 | |
| CN | 101132614 A | 2/2008 | |
| CN | 100455112 C | 1/2009 | |
| EP | 0862346 A2 | 9/1998 | |
| EP | 2046078 A1 | 4/2009 | |
| EP | 2056639 A2 | 5/2009 | |
| EP | 2111074 A1 | 10/2009 | |
| EP | 2169972 A4 * | 8/2010 | ............ H04W 48/20 |
| EP | 1947889 A3 * | 9/2012 | ............ H04W 48/20 |
| EP | 2168271 B1 | 11/2015 | |
| KR | 20050017514 A | 2/2005 | |
| KR | 20060099462 A | 9/2006 | |
| WO | WO 2004019644 A1 | 3/2004 | |
| WO | WO 2006019243 A1 * | 2/2006 | ............ H04W 48/20 |
| WO | WO 2008057359 A1 | 5/2008 | |
| WO | WO 2008157573 A1 | 12/2008 | |
| WO | WO 2009045078 A2 | 4/2009 | |

OTHER PUBLICATIONS

"3$^{rd}$ Generation Partnership Project; Technical Specification Group Radio Access Network; User Equipment (UE) procedures in idle mode and procedures for cell reselection in connected mode (Release 6)," 3GPP TS 25.304, V6.10.0, 3$^{rd}$ Generation Partnership Project, Valbonne, France, SAMSUNG-HNDCA-000012757-000012793 (Mar. 2008).

"3$^{rd}$ Generation Partnership Project; Technical Specification Group Radio Access Network; User Equipment (UE) procedures in idle mode and procedures for cell reselection in connected mode (Release 7)," 3GPP TS 25.304, V7.4.0, 3$^{rd}$ Generation Partnership Project, Valbonne, France, SAMSUNG-HNDCA-000012794-000012834 (Dec. 2007).

"3$^{rd}$ Generation Partnership Project; Technical Specification Group Radio Access Network; User Equipment (UE) procedures in idle mode and procedures in cell reselection in connected mode (Release 8)," 3GPP TS 25.304, V8.0.0, 3$^{rd}$ Generation Partnership Project, Valbonne, France, SAMSUNG-HNDCA-000012835-000012875 (Dec. 2007).

"3$^{rd}$ Generation Partnership Project; Technical Specification Group Radio Access Network; User Equipment (UE) procedures for cell reselection in connected mode (Release 8)," 3GPP TS 25.304, V8.1.0, 3$^{rd}$ Generation Partnership Project, Valbonne, France, SAMSUNG-HNDCA-000012876-000012916 (Mar. 2008).

"3$^{rd}$ Generation Partnership Project; Technical Specification Group Radio Access Network; Evolved Universal Terrestrial Radio Access (E-UTRA); User Equipment (UE) procedures in idle mode (Release 8)," 3GPP TS 36.304, V8.1.0, 3$^{rd}$ Generation Partnership Project, Valbonne, France, SAMSUNG-HNDCA-000013026-000013054 (Mar. 2008).

(56) References Cited

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification (Release 8)," 3GPP TS 36.331, V8.0.0, 3rd Generation Partnership Project, Valbonne, France, SAMSUNG-HNDCA-000013081-000013136 (Dec. 2007).

"3rd Generation Partnership Project; Technical Specification Group Radio Access Network; Evolved Universal Terrestrial Radio Access (E-UTRA) Radio Resource Control (RRC); Protocol specification (Release 8)," 3GPP TS 36.331, V8.1.0, 3rd Generation Partnership Project, Valbonne, France, SAMSUNG-HNDCA-000013137-000013258 (Mar. 2008).

"3rd Generation Partnership Project; Technical Specification Group Radio Access Network; Evolved Universal Terrestrial Radio Access (E-UTRA); User Equipment (UE) procedures in idle mode (Release 8)," 3GPP TS 36.304, V8.0.0, pp. 1-27, 3rd Generation Partnership Project, Valbonne, France, SAMSUNG-HNDCA-000013842-000013868 (Dec. 2007).

"Idle Mode and Common Channel Behavior; WCDMA RAN; User Description," pp. 1-63, Ericsson AB, Stockholm, Sweden, SAMSUNG-HNDCA-000014084-14150 (2008).

Sallent et al., "Operator's RAT Selection Policies Based on the Fittingness Factor Concept," 16th IST Mobile and Wireless Communications Summit, Institute of Electrical and Electronics Engineers, New York, New York, SAMSUNG-HNDCA-000014166-000014171 (Jul. 1-5, 2007).

"Intra-LTE and inter-RAT cell reselection," 3GPP TSG-RAN2 Meeting #56 bis, Sorrento, Italy, Tdoc R2-070224, 3rd Generation Partnership Project, Valbonne, France, SAMSUNG-HNDCA-000014984-000014988 (Jan. 15-19, 2007).

"LS on neighbour cellist in LTE," 3GPP TSG RAN WG2 #57bis, St. Julian's, Malta, R2-071573, 3rd Generation Partnership Project, Valbonne, France, SAMSUNG-HNDCA-000014991 (Mar. 26-30, 2007).

"E-UTRA Measurements and Cell Reselection Considerations," 3GPP TSG-RAN WG2 Meeting #58, Kobe, Japan, R2-071727, 3rd Generation Partnership Project, Valbonne, France, SAMSUNG-HNDCA-000014997-000015000 (May 7-11, 2007).

"Measurement events considerations for E-UTRAN," 3GPP TSG-RAN WG2 Meeting #60, Jeju, South Korea, R2-074876, 3rd Generation Partnership Project, Valbonne, France, SAMSUNG-HNDCA-000015005-000015007 (Nov. 5-9, 2007).

"Inter-frequency/RAT idle mode mobility control," 3GPP TSG RAN WG2 #60, Jeju, Korea, Tdoc-R2-075161, 3rd Generation Partnership Project, Valbonne, France, SAMSUNG-HNDCA-000015012-000015014 (Nov. 5-9, 2007).

"Reselection scenarios for multi-RAT terminals in Rel-8," 3GPP TSG-RAN WG2 Meeting #60bis, Seville, Spain, R2-080338, 3rd Generation Partnership Project, Valbonne, France, SAMSUNG-HNDCA-000015015-000015019 (Jan. 14-18, 2008).

"Inter-RAT Reselection from UTRAN to E-UTRAN," 3GPP TSG RAN WG2 #60bis, Sevilla, Spain, R2-080254, 3rd Generation Partnership Project, Valbonne, France, SAMSUNG-HNDCA-000015020-000015025 (Jan. 14-18, 2008).

"Details of cell reselection parameters," 3GPP TSG-RAN WG2 #60-bis, Sevilla, Spain, R2-080443, 3rd Generation Partnership Project, Valbonne, France, SAMSUNG-HNDCA-000015026 (Jan. 14-18, 2008).

"NAS States, Persistent Scheduling and C-RNTI Allocation at Handover," Change Request, 3GPP TSG-RAN2 Meeting #61, Sorrento, Italy, R2-080677, 3rd Generation Partnership Project, Valbonne, France, SAMSUNG-HNDCA-000015118-000015229 (Feb. 11-15, 2008).

Muhammad, "Roaming from one 'G' to another," IEEE Communications Engineer, pp. 40-43, Institute of Electrical and Electronics Engineers, New York, New York, SAMSUNG-HNDCA-000015319-000015322 (Apr./May 2004).

"3rd Generation Partnership Project; Technical Specification Group Radio Access Network; Evolved Universal Terrestrial Radio Access (E-UTRA) User Equipment (UE) procedures in idle mode (Release 8)," 3GPP TS 36.304, V2.0.0, 3rd Generation Partnership Project, Valbonne, France, SAMSUNG-HNDCA-000015953-000015978 (Oct. 2007).

"The '197 Patent; Samsung's Patent Local Rule 3-3 and 3-4 Disclosures," Case No. 16-cv-02787-WHO, pp. 101-112 (Published no later than Apr. 18, 2017).

"The '246 Patent; Samsung's Local Patent Rule 3-3 and 3-4 Disclosures," Case No. 16-cv-02787-WHO, pp. 90-101 (Published no later than Apr. 18, 2017).

Manninen, "Chapter 6; WCDMA Radio Interface; Radio Resource Management and 3GPP Radio Parameters," UMTS Radio Network Planning, Optimization and QoS Management, pp. 207-257, Kluwer Academic Publishers, Dordrecht, Netherlands, SAMSUNG-HNDCA-000018747-000018797 (2003).

"3rd Generation Partnership Project; Technical Specification Group Radio Access Network; User Equipment (UE) procedures in idle mode and procedures for cell reselection in connected mode (Release 8)," 3GPP TS 25.304, V8.0.0, 3rd Generation Partnership Project, Valbonne, France, SAMSUNG-HNDCA-000018959-000018999 (Dec. 2007).

"3rd Generation Partnership Project; Technical Specification Group Radio Access Network; User Equipment (UE) procedures in idle mode and procedures for cell reselection in connected mode (Release 7)," 3GPP TS 25.304, V7.5.0, 3rd Generation Partnership Project, Valbonne, France, SAMSUNG-HNDCA-000019000-000019040 (Mar. 2008).

"Exhibit 003-1; Samsung's Invalidity Contentions for U.S. Pat. No. 8,996,003 ("'003 Patent") in View of 3GPP TS 36.304, V8.1.0, V8.0.0, and V2.0.0 ("TS 36.304")," pp. 1-46 (Published no later than Apr. 18, 2017).

"Exhibit 003-2; Samsung's Invalidity Contentions for U.S. Pat. No. 8,996,003 ("'003 Patent") in View of Reselection Scenarios for *Multi-RAT Terminals in Rel-8*, Nokia Corporation and Nokia Siemens Networks, 3GPP TSG-RAN WG2 Meeting #60bis, Jan. 14-18, 2008 (R2-080338)," pp. 1-38 (Published no later than Apr. 18, 2017).

"Exhibit 003-3; Samsung's Invalidity Contentions for U.S. Pat. No. 8,996,003 ("'003 Patent") in View of *Inter-Frequency/RAT Idle Mode Mobility Control*, NTT DoCoMo, Inc., 3GPP TSG-RAN WG2 Meeting #60, Nov. 5-9, 2007 ("R2-075161")," pp. 1-35 (Published no later than Apr. 18, 2017).

"Exhibit 003-4; Samsung's Invalidity Contentions for U.S. Pat. No. 8,996,003 ("'003 Patent") in View of U.S. Patent Publication No. 2008/0176565 ("Eerolainen")," pp. 1-48 (Published no later than Apr. 18, 2017).

"Exhibit 003-5; Samsung's Invalidity Contentions for U.S. Pat. No. 8,996,003 ("'003 Patent") in View of U.S. Patent Application Publication No. 2008/0108353 ("Lee")," pp. 1-96 (Published no later than Apr. 18, 2017).

"Exhibit 003-6; Samsung's Invalidity Contentions for U.S. Pat. No. 8,996,003 ("'003 Patent") in View of 3GPP TS 36.311 V8.1.0 ("TS 36.311")," pp. 1-77 (Published no later than Apr. 18, 2017).

"Exhibit 003-7; Samsung's Invalidity Contentions for U.S. Pat. No. 8,996,003 ("'003 Patent") in View of *Details of Cell Reselection Parameters*, LG Electronics, 3GPP TSG-RAN WG2 Meeting #60bis ("R2-080443")," pp. 1-23 (Published no later than Apr. 18, 2017).

"Exhibit 003-B; Obviousness," pp. i-93 (Published no later than Apr. 18, 2017).

"Exhibit 197-1; Samsung's Invalidity contentions for U.S. Pat. No. 8,412,197 ("'197 Patent") in View of 3GPP TS 36.304, V8.1.0, V8.0.0, and V2.0.0 ("TS 36.304")," pp. 1-36 (Published no later than Apr. 18, 2017).

"Exhibit 197-2; Samsung's Invalidity Contentions for U.S. Pat. No. 8,412,197 ("'197 Patent") in View of *Reselection Scenarios for Multi-Rat Terminals in Rel-8*, Nokia Corporation and Nokia Siemens Networks, 3GPP TSG-RAN WG2 Meeting #60bis, Jan. 14-18, 2008 ("R2-080338")," pp. 1-20 (Published no later than Apr. 18, 2017).

"Exhibit 197-3; Samsung's Invalidity Contentions for U.S. Pat. No. 8,412,197 ("'197 Patent") in View of *Inter-Frequency/RAT Idle Mode Mobility Control*, NTT DoCoMo, Inc., 3GPP TSG-RAN

(56) References Cited

OTHER PUBLICATIONS

WG2 Meeting #60, Nov. 5-9, 2007 ("R2-075161"), pp. 1-21 (Published no later than Apr. 18, 2017).
"Exhibit 197-4; Samsung's Invalidity Contentions for U.S. Pat. No. 8,412,197 ("'197 Patent") in View of U.S. Patent Publication No. 2008/0176565 ("Eerolainen"), pp. 1-34 (Published no later than Apr. 18, 2017).
"Exhibit 197-5; Samsung's Invalidity Contentions for U.S. Pat. No. 8,412,197 ("'197 Patent") in View of U.S. Patent Application Publication No. 2008/0108353 ("Lee"), pp. 1-82 (Published no later than Apr. 18, 2017).
"Exhibit 197-6; Samsung's Invalidity Contentions for U.S. Pat. No. 8,412,197 ("'197 Patent") in View of 3GPP TS 36.311 V8.1.0 ("TS 36.311"), pp. 1-46 (Published no later than Apr. 18, 2017).
"Exhibit 197-7; Samsung's Invalidity Contentions for U.S. Pat. No. 8,412,197 ("'197 Patent") in View of *Details of Cell Reselection Parameters*, LG Electronics, 3GPP TSG-RAN WG2 Meeting #60bis ("R2-080443"), pp. 1-14 (Published no later than Apr. 18, 2017).
"Exhibit 197-B; Obviousness," pp. i-93 (Published no later than Apr. 18, 2017).
"Exhibit 246-1; Samsung's Invalidity contentions for U.S. Pat. No. 8,639,246 ("'246 Patent") in View of 3GPP TS 36.304, V8.1.0, V8.0.0, and V2.0.0 ("TS 36.304"), pp. 1-41 (Published no later than Apr. 18, 2017).
"Exhibit 246-2; Samsung's Invalidity Contentions for U.S. Pat. No. 8,639,246 ("'246 Patent") in View of *Reselection Scenarios for Multi-Rat Terminals in Rel-8*, Nokia Corporation and Nokia Siemens Networks, 3GPP TSG-RAN WG2 Meeting #60bis, Jan. 14-18, 2008 ("R2-080338"), pp. 1-28 (Published no later than Apr. 18, 2017).
"Exhibit 246-3; Samsung's Invalidity Contentions for U.S. Pat. No. 8,639,246 ("'246 Patent") in View of *Inter-Frequency/RAT idle Mode Mobility Control*, NTT DoCoMo, Inc., 3GPP TSG-RAN WG2 Meeting #60, Nov. 5-9, 2007 ("R2-075161"), pp. 1-28 (Published no later than Apr. 18, 2017).
"Exhibit 246-4; Samsung's Invalidity Contentions for U.S. Pat. No. 8,639,246 ("'246 Patent") in View of U.S. Patent Publication No. 2008/0176565 ("Eerolainen"), pp. 145 (Published no later than Apr. 18, 2017).
"Exhibit 246-5; Samsung's Invalidity Contentions for U.S. Pat. No. 8,639,246 ("'246 Patent") in View of U.S. Patent Application Publication No. 2008/0108353 ("Lee"), pp. 1-80 (Published no later than Apr. 18, 2017).
"Exhibit 246-6; Samsung's Invalidity Contentions for U.S. Pat. No. 8,639,246 ("'246 Patent") in View of 3GPP TS 36.311 V8.1.0 ("TS 36.311"), pp. 1-60 (Published no later than Apr. 18, 2017).
"Exhibit 246-7; Samsung's Invalidity Contentions for U.S. Pat. No. 8,639,246 ("'246 Patent") in View of *Details of Cell Reselection Parameters*, LG Electronics, 3GPP TSG-RAN WG2 Meeting #60bis ("R2-080443"), pp. 1-20 (Published no later than Apr. 18, 2017).
"Exhibit 246-B; Obviousness," pp. i-93 (Published no later than Apr. 18, 2017).
"Inter-frequency/RAT idle mode mobility control," 3GPP TSG RAN WG2 #60, Jeju, Korea, Tdoc-r2-075161, $3^{rd}$ Generation Partnership Project, Valbonne, France (Nov. 5-9, 2007).
"Inter-RAT Reselection form UTRAN to E-UTRAN," 3GPP TSG RAN WG2 #60bis, Sevilla, Spain, R2-080254, $3^{rd}$ Generation Partnership Project, Valbonne, France (Jan. 14-18, 2008).
"Reselection scenarios for multi-RAT terminals in Rel-8," 3GPP TSG-RAN WG2 Meeting #60bis, Seville, Spain, R2-080338, $3^{rd}$ Generation Partnership Project, Valbonne, France (Jan. 14-18, 2008).
"Details of cell reselection parameters," 3GPP TSG-RAN WG2 #60-bis, Sevilla, Spain, R2-080443, $3^{rd}$ Generation Partnership Project, Valbonne, France (Jan. 14-18, 2008).
"NAS States Persistent Scheduling and C-RNTI Allocation at Handover," Change Request, 3GPP TSG-RAN2 Meeting #61, Sorrento, Italy, R2-080677, $3^{rd}$ Generation Partnership Project, Valbonne, France (Feb. 11-15, 2008).
"LTE Introduction/ Priority reselection method," Change Request, 3GPP TSG-RAN-WG2 Meeting #61 bis, Sorrento, Italy, R2-081050, $3^{rd}$ Generation Partnership Project, Valbonne, France (Feb. 11-15, 2008).
1st Office Action in corresponding U.S. Appl. No. 12/902,933 (dated Jan. 21, 2011).
U.S. Appl. No. 12/902,933.
U.S. Appl. No. 12/955,392.
1st Notice of Allowance in corresponding U.S. Appl. No. 12/902,933 (dated Aug. 10, 2012).
2nd Notice of Allowance in corresponding U.S. Appl. No. 12/902,933 (dated Nov. 28, 2012).
2nd Office Action in corresponding U.S. Appl. No. 12/902,933 (dated Sep. 14, 2011).
1st Office Action in related U.S. Appl. No. 13/270,089 (dated Feb. 3, 2012).
Notice of Allowance in corresponding U.S. Appl. No. 13/672,494 (dated Sep. 20, 2013).
1st Office Action in corresponding U.S. Appl. No. 13/672,494 (dated Mar. 15, 2013).
"3GPP TS 25.304—3rd Generation Partnership Project; Technical Specification Group Radio Access Network; User Equipment (UE) Procedures in Idle Mode and Procedures for Cell Reselection in Connected Mode (Release 8)," 3GPP Technical Specification, Mar. 2008, V8.1.0, 3GPP, Valbonne, France.
"3GPP TS 25.331," 3GPP Technical Specification, Dec. 2007, V8.1.0, 3GPP, Valbonne, France.
"3GPP TS 36.304—3rd Generation Partnership Project; Technical Specification Group Radio Access Network; Evolved Universal Terrestrial Radio Access (E-UTRA); User Equipment (UE) Procedures in Idle Mode (Release 8)," 3GPP Technical Specification, Mar. 2008, V8.1.0, 3GPP, Valbonne, France.
"3GPP TS 36.331—3rd Generation Partnership; Technical Specification Group Radio Access Network; Evolved Universal Terrestrial Radio Access (E-UTRA) Radio BS Resource Control (RRC); Protocol Specification (Release 8)," 3GPP Technical Specification, Mar. 2008, V8.1.0, 3GPP, Valbonne, France.
"R2-073622—E-UTRA Cell Selection and Cell Reselection Aspects," 3GPP TSGRAN WG2 Meeting #59, Aug. 20-24, 2007, 3GPP, Valbonne, France.
"Tdoc-R2-074001—IDLE Mode Mobility Control Principles," 3GPP TSG RAN WG2 #59bis, Oct. 81h-1ih, 2007, 3GPP, Valbonne, France.
"TSGR2#6(99)808—Cell Selection and Cell Reselection Criteria," TSG-RAN BV Working Group 2 (Radio Layer 2 and Radio Layer 3), Aug. 161h-201h, 1999, 3GPP, Valbonne, France.
1st Office Action in related U.S. Appl. No. 12/955,392 (dated Feb. 10, 2011).
Final Office Action in related U.S. Appl. No. 12/955,392 (dated Apr. 28, 2011).
U.S. Appl. No. 12/902,933 (Aug. 1, 2011).
"*Samsung Electronics Co., Ltd.*, Petitioner v. *Huawei Technologies Co., Ltd.* Patent Owner," Case IPR2017-1475, U.S. Pat. No. 8,996,003, Petition for Inter Partes Review of U.S. Pat. No. 8,996,003 Under 35 U.S.C §312 and 37 C.F.R. § 42.104 (May 24, 2017).
"*Samsung Electronics Co., Ltd.* Petitioner v. *Huawei Technologies Co., Ltd.* Patent Owner," Case IPR2017-TBD, U.S. Pat. No. 8,996,003, Petitioner's Exhibit 1012 Declaration of Raziq Yaqub, Ph.D., Samsung Exhibit 1012, (May 24, 2017).
"*Samsung Electronics Co., Ltd.* Petitioner v. *Huawei Technologies Co., Ltd.* Patent Owner," Case IPR2017-TBD, U.S. Pat. Nos. 8,412,197; 8,996,003, and 8,639,246, Petitioner's Exhibit 1003 Declaration of Tim Arthur Williams, Ph.D., Samsung Exhibit 1003, pp. 1-103, (May 24, 2017).
"Plaintiff's Complaint and Patent Infringement; Demand for Jury Trial," Case 3:16-cv-02787-SK, *Huawei Technologies Co., Ltd., Huawei Device USA, Inc., and Huawei Technologies USA, Inc.* Plaintiffs, vs., *Samsung Electronics Co., Ltd., Samsung Electronics America, Inc., and Samsung Research America*, Defendants., Document 1, pp. 1-47, Samsung Exhibit 1008 (May 24, 2016).

(56) References Cited

OTHER PUBLICATIONS

"*Samsung Electronics Co., Ltd.*, Petitioner v. *Huawei Technologies Co., Ltd.* Patent Owner," Case IPR2017-1471 U.S. Pat. No. 8,412,197, Petition for Inter Partes Review of U.S. Pat. No. 8,412,197 Under 35 U.S.C §312 and 37 C.F.R. § 42.104 (May 24, 2017).
"About 3GPP Home," http://www/3gpp.org/about-3gpp/about-3gpp, pp. 1-4, $3^{rd}$ Generation Partnership Project, Valbonne, France, (Downloaded May 17, 2017).
"3rd Generation Partnership Project; Technical Specification Group Services and System Aspects; Technical Specification Group working methods (Release 8)," 3GPP TR 21.900 V8.0.0, Samsung Exhibit 1016, pp. 1-34, $3^{rd}$ Generation Partnership Project, Valbonne, France (Sep. 2007).
"Final Report of 3GPP TSG RAN WG1 #52bis v1.0.0 (Shenzhen, China, Mar. 31-Apr. 4, 2008)," 3GPP TSG RAN WG1 Meeting #53 Kansas City, USA, R1-081711, Samsung Exhibit 1017, pp. 1-78, $3^{rd}$ Generation Partnership Project, Valbonne, France (May 5-9, 2008).
Johansson et al., "LTE test bed," Ericsson Review No. 1, pp. 1-5, Samsung Exhibit 1019 (2007).
"*Samsung Electronics Co., Ltd.*, Petitioner v. *Huawei Technologies Co., Ltd.* Patent Owner," Case IPR2017-1474 U.S. Pat. No. 8,639,246, Petition for Inter Partes Review of U.S. Pat. No. 8,639,246 Under 35 U.S.C §312 and 37 C.F.R. § 42.104, (May 24, 2017).
Dahlman et al., "3G Evolution HSPA and LTE for Mobile Broadband," Samsung Exhibit 1013, pp. 1-55, Elsevier Ltd., (2008).
"*Samsung Electronics Co., Ltd.*, Petitioner, v. *Huawei Technologies Co., Ltd.*, Patent Owner.," Case No. IPR2017-01471, U.S. Pat. No. 8,412,197, Patent Owner's Preliminary Response, (Sep. 11, 2017).
"*Samsung Electronics Co., Ltd.*, Petitioner, v. *Huawei Technologies Co., Ltd.*, Patent Owner.," Case No. IPR2017-01474 U.S. Pat. No. 8,639,246, Patent Owner's Preliminary Response, (Sep. 13, 2017).
"*Samsung Electronics Co., Ltd.*, Petitioner, v. *Huawei Technologies Co., Ltd.*, Patent Owner.," Case No. IPR2017-01475, U.S. Pat. No. 8,996,003, Patent Owner's Preliminary Response, (Sep. 6, 2017).
"Reexamination Decision for Petition of Declaration of Invalidity, No. 31142," Certified English Translation and Translation Affidavit (Feb. 27, 2017).

* cited by examiner

METHOD, TERMINAL, AND SYSTEM FOR CELL RESELECTION

CROSS-REFERENCE TO RELATED APPLICATIONS

This application is a continuation of U.S. patent application Ser. No. 14/671,842, filed on Mar. 27, 2015, which is a is a continuation of U.S. patent application Ser. No. 14/135, 045, filed on Dec. 19, 2013 and issued on Mar. 31, 2015 as U.S. Pat. No. 8,996,003, which is a continuation of U.S. patent application Ser. No. 13/672,494, filed on Nov. 8, 2012 and issued on Jan. 28, 2014 as U.S. Pat. No. 8,639,246, which is a continuation of U.S. patent application Ser. No. 12/902,933, filed on Oct. 12, 2010 and issued on Apr. 2, 2013 as U.S. Pat. No. 8,412,197, which in turn is a continuation of International Patent Application No. PCT/CN2009/071194, filed on Apr. 8, 2009. The International Patent Application claims priority to Chinese Patent Application No. 200810091957.6, filed on Apr. 9, 2008. The aforementioned patent applications and patents are hereby incorporated by reference in their entireties.

This application is related to U.S. Pat. No. 8,041,355, filed on Nov. 29, 2010, and issued on Oct. 18, 2011, and U.S. Pat. No. 8,185,111, filed on Oct. 10, 2011, and issued on May 22, 2012.

FIELD OF THE INVENTION

The present invention relates to a field of mobile communications, and more particularly, to a method, terminal, and system for cell reselection.

BACKGROUND

With developments in the mobile communication field, various mobile communication systems have emerged, for example, a Global System for Mobile Communication (GSM), an Enhanced Data for GSM Evolution (EDGE) system, a GSM/EDGE Radio Access Network (GERAN) system, a Wideband Code Division Multiple Access (WCDMA) system, a Code Division Multiple Access (CDMA) system, a Code Division Multiple Access 2000 (CDMA2000) system, a Time Division-Synchronous CDMA (TD-SCDMA) system, a Long Term Evolution (LTE) system under development and establishment, a World Interoperability for Microwave Access (WIMAX) system, etc. The WCDMA system may also be referred to as Universal Mobile Telecommunications System (UMTS). Due to the emergence of the various systems, when a terminal performs cell reselection during movement, there may be several frequencies available for selection in the system, and there may be many cells of several systems available for selection. Therefore, it becomes an important issue as to how the terminal reselects a suitable cell and how to reduce measurements to save power energy.

In the current LTE system, considering that the terminal should reduce measurement overhead to save power energy, when performing cell reselection, the terminal will decide a cell on which the terminal is to camp according to the priority. Specifically, the terminal will first measure a frequency or system having a higher priority. If a cell of the frequency or system having a higher priority meets the cell reselection criterion, the cell will be reselected; otherwise, a cell having a lower priority will be measured. If a terminal camps on a cell having a lower priority, a cell having a higher priority might be measured periodically. The priority-based cell reselection method may reduce the measurements by the terminal and save power energy. Meanwhile, a good priority setting may lead to load balance.

In the existing technical solutions, the terminal performs cell reselection by using a dedicated priority list established by the non-LTE mobile communication system. The Access Network (AN) node or the Core Network (CN) node has to add more signaling for establishment of the dedicated priorities, which leads to higher costs for network upgrade.

SUMMARY

To solve the problems in the prior arts that establishment of the dedicated priority list by the non-LTE system causes too much increased signaling and too high costs for network upgrade, an embodiment of the invention provides a method, terminal, and system for cell reselection.

An embodiment of the invention provides a method for cell reselection, including:

a terminal obtains a dedicated priority list and a valid time of the dedicated priority list from a first system, and the terminal performs a cell reselection according to the dedicated priority list and the valid time of the dedicated priority list, when the terminal camps on a cell of a second system.

An embodiment of the invention provides a terminal, including:

a first obtaining unit configured to obtain a dedicated priority list and a valid time of the dedicated priority list from a first system; a first storage configured to store the dedicated priority list; and a first processing unit configured to perform a cell reselection according to the dedicated priority list and the valid time of the dedicated priority list stored in the first storage when the terminal camps on a second system.

An embodiment of the invention provides a system, including a network-side device and a terminal as provided in any embodiment of the invention, where the network-side device is configured to send the dedicated priority list.

In an example where the first system is an LTE system and the second system is a non-LTE system, the terminal according to the embodiments of the invention may perform cell reselection by using the dedicated priority list obtained from the LTE system, so as to free the non-LTE system from establishing the dedicated priority list. Problems in the prior arts that establishment of the dedicated priority list by the non-LTE system causes too much increased signaling and too high costs for network upgrade, are solved.

DETAILED DESCRIPTION

To further clarify the objects, the technical solutions, and the advantages of the present invention, detailed descriptions are given below to the implementation of the present invention with reference to the accompanying drawings.

Figure 1:
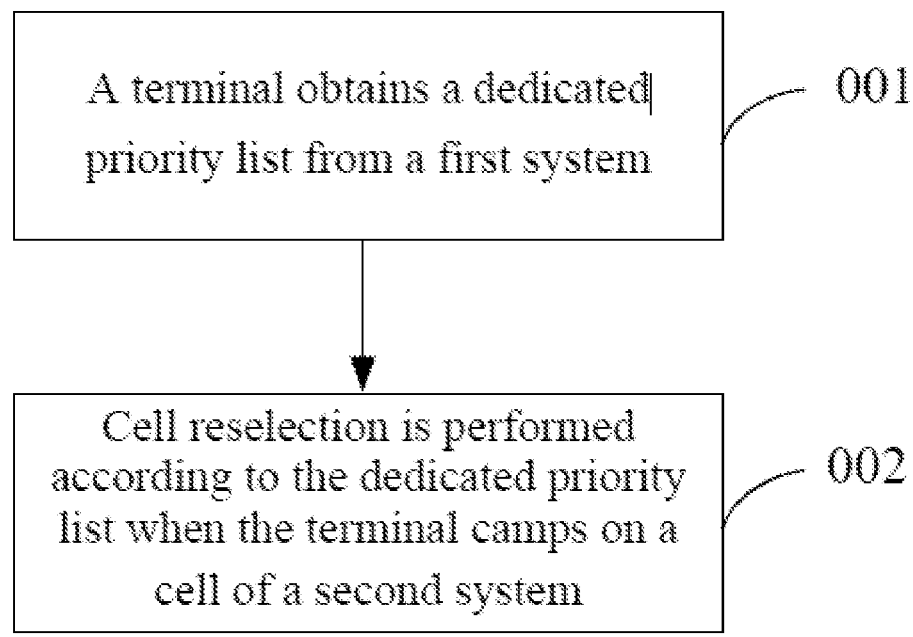
FIG. 1 is a flow chart of a method provided in an embodiment of the present invention.

Referring to FIG. 1, a cell reselection method provided in an embodiment of the present invention includes the following steps.

In step 001, a terminal obtains a dedicated priority list from a first system.

In step 002, the terminal performs a cell reselection according to the dedicated priority list when the terminal camps on a cell of a second system.

In the above embodiment of the invention, the terminal performs the cell reselection by using the dedicated priority list obtained from the first system. In this way, there is no need for the second system to establish the dedicated priority list.

Further, the first system may be an LTE system and the second system may be a non-LTE system in an embodiment of the invention. Accordingly, problems in the prior arts that establishment of the dedicated priority list by the non-LTE system causes too much increased signaling and too high costs for network upgrade, are solved.

Further, the terminal in this embodiment may also obtain the valid time of the dedicated priority list from the LTE system. Before the valid time expires, the terminal camping on a cell of the non-LTE system may perform cell reselection according to the dedicated priority list. After the valid time expires, the dedicated priority list is invalid. Then, the terminal may perform cell reselection according to a public priority list, or perform cell reselection according to a result measured in accordance with a cell signal quality criterion, or search for a cell of the LTE system.

Further, the above public priority list may be obtained by the terminal from the LTE system or the non-LTE system. Optionally, the terminal may process the public priority list according to an indication which is used to notify the terminal that the non-LTE system will not deliver the public priority list and/or notify the terminal to store the public priority list obtained from the LTE system.

Further, the terminal may also perform other processes related to cell reselection according to an indication from the non-LTE system. The indication may notify the terminal of any one of (or the combination of) the following: (1) searching for a cell of the LTE system when the dedicated priority list is invalid; (2) searching for a cell of the LTE system when the terminal does not store the dedicated priority list and the public priority list; and (3) performing cell reselection according to a result measured in accordance with a cell signal quality criterion when the terminal does not store the dedicated priority list and the public priority list.

In an embodiment of the invention, if no dedicated priority list is delivered to the terminal from a UMTS or GERAN system, the terminal may use the dedicated priority list obtained from LTE system and the time length of the valid time of the dedicated priority list. The terminal may use a public priority list delivered from the UMTS or GERAN system. Alternatively, if no public priority list is delivered from the UMTS or GERAN system, or a public priority list delivered from the UMTS or GERAN system is not received, a public priority list obtained from the LTE system may be used. When the terminal stores both the dedicated priority list and the public priority list, the dedicated priority list may be used for cell reselection. When the terminal has no dedicated priority list, the public priority list may be used for cell reselection.

It should be noted that, UMTS and GERAN systems are taken as an example to describe the embodiments of the invention for ease of illustration. The embodiments of the invention are equally applicable to other non-LTE systems, for example, the GSM system, the WCDMA system, the CDMA system, the TD-SCDMA system, or the WIMAX system. Additionally, signal quality of cell reselection, which is one of the performance measurements related to the cell reselection procedure, is taken as an example for illustration in an embodiment of the invention.

A priority in the priority list may refer to the priority level of a frequency or a Radio Access Technology (RAT). It may also refer to the priority level of a Frequency Band in GERAN. The priority list may include the priority levels of the frequency of the serving cell, its adjacent frequencies, and the neighboring systems, as well as the priority level assigned for each frequency or Frequency Band of a neighboring system.

In the following embodiments 1-4, the cell reselection procedure is described in a case where the terminal is idle, that is, the terminal is power-on but not activated.

Embodiment 1

In this embodiment, the terminal camps on a cell of an LTE system. The LTE system may deliver a dedicated priority list via a dedicated signaling and deliver a public priority list in system broadcast information. An UMTS or GERAN system may deliver a public priority list. The public priority list delivered in broadcast information of the UMTS or GERAN system may indicate a priority as LTE>UMTS>GERAN. A public priority list may be delivered in broadcast information of the LTE system. Alternatively, the public priority list may be delivered via a dedicated signaling (for example, a Radio Resource Control (RRC) dedicated signaling) or a Non-Stratum (NAS) message when a dedicated RRC connection is established. The delivered public priority list may indicate that LTE>UMTS>GERAN. It can be understood that the above priority lists may indicate the same or different priorities. The dedicated priority list delivered in dedicated signaling of the LTE system may indicate that GERAN>UMTS>LTE.

Figure 2:
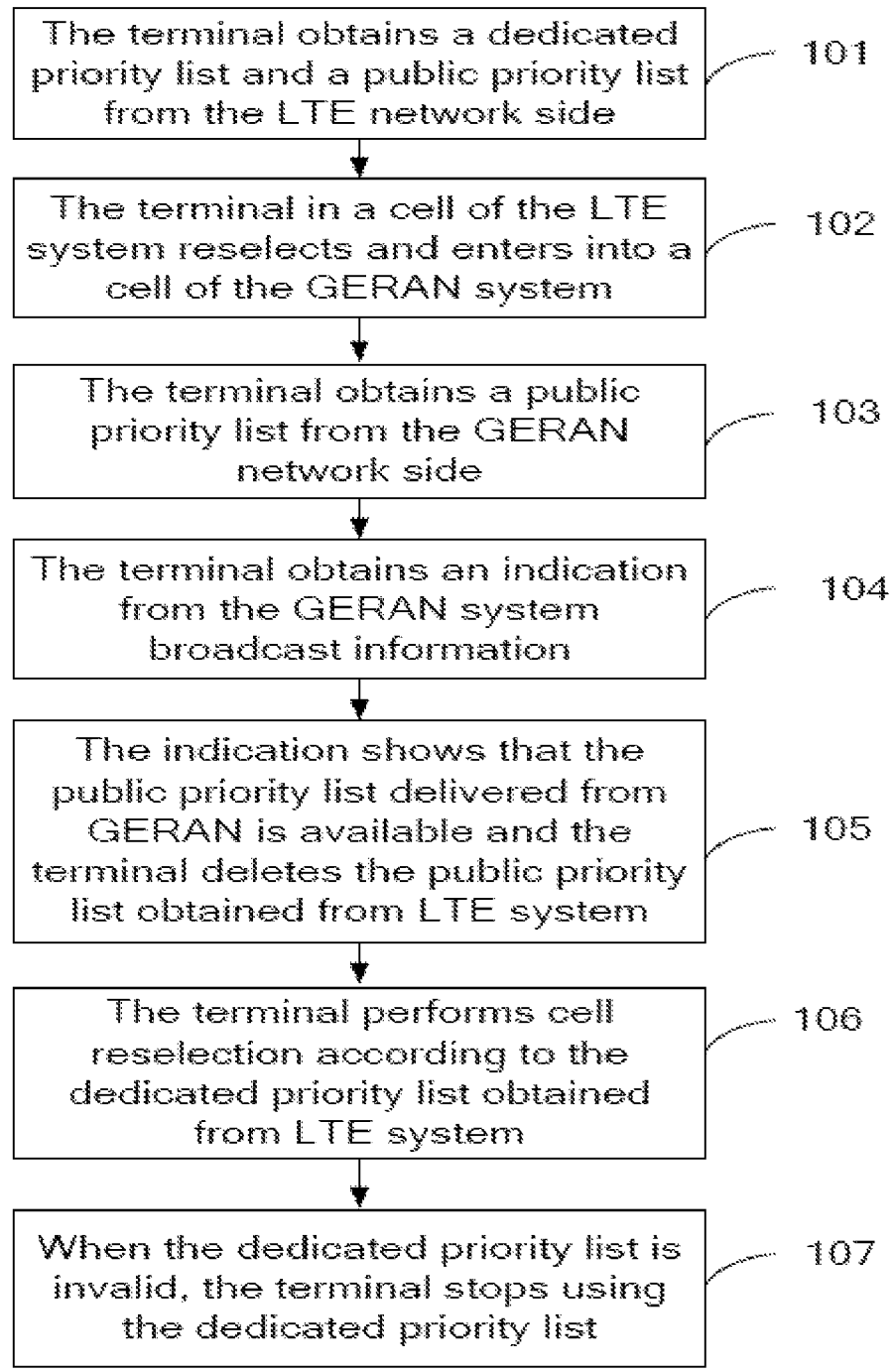
FIG. 2 is a flow chart of a method provided in embodiment 1 of the present invention.

Referring to FIG. 2, a method for cell reselection according to embodiment 1 of the invention may include the following steps.

In step 101, when a terminal camps on a cell of an LTE system, the terminal obtains a dedicated priority list and a public priority list from the LTE network side, and stores the two priority lists.

In step 102, the terminal performs cell reselection according to the obtained dedicated priority list. Since the dedicated priority list indicates a priority as GERAN>UMTS>LTE, the terminal in the cell of the LTE system reselects and enters into a cell of a GERAN system.

Those skilled in the art will appreciate that the terminal in the cell of the LTE system will reselects and camps on the cell of the GERAN system according to the dedicated priority list. If signal quality of the cell of the GERAN system does not meet the signal quality criterion, the terminal in the cell of the GERAN system performs a cell reselection again according to the dedicated priority list so as to reselect and enters into a cell of an UMTS system.

In step 103, the terminal obtains a public priority list from the UMTS or GERAN network side and stores the public priority list.

In step 104, the terminal in the cell of the UMTS or GERAN system obtains an indication from the UMTS or GERAN system broadcast information.

The indication is delivered periodically in the system broadcast information from the UMTS or GERAN network side. The indication indicates whether the public priority list delivered from the UMTS or GERAN system is usable or not. In this embodiment, for example, the indication shows that the public priority list delivered from the UMTS or GERAN system is usable.

It can be understood that the delivery of the indication in the system broadcast information from the UMTS or GERAN network side is not limited by whether the terminal is in the cell of the UMTS or GERAN system.

In step 105, the above indication notifies the terminal that the public priority list delivered from the UMTS or GERAN network side is usable. Then, the terminal deletes the public priority list obtained from the LTE system.

The above deletion of the public priority list obtained from the LTE system by the terminal is optional. Alternatively, the terminal may label the public priority list obtained from the LTE system as "unusable", rather than deleting the list.

In step 106, before the signal quality of the current cell decreases to a certain level, the terminal in the cell of the UMTS or GERAN system may perform cell reselection according to the dedicated priority list obtained from the LTE system until the dedicated priority list is invalid.

The invalidation of the dedicated priority list may be implemented by setting a timer. In other words, a valid time of the dedicated priority list is set by a timer and the timer starts when the terminal obtains the dedicated priority list. Before the timer expires, the dedicated priority list is GERAN>UMTS>LTE. Thus, the terminal will attempt to reselect a cell of the LTE system only when the signal quality of the current cell decreases to a certain level (for example, when it is lower than a preset threshold value). The valid time of the dedicated priority list may be delivered to the terminal by an evolved base station (eNodeB) via a RRC dedicated signaling, for example, an RRC Connection Release message, or may be delivered in a Non-Access Stratum (NAS) message to the terminal by a CN node. Before the timer expires, the terminal camps on a cell which has the highest priority shown in the dedicated priority list. At this time, the terminal decides whether to perform cell reselection according to signal quality of the cell. When the signal quality of the cell decreases to a preset threshold, the terminal may perform cell reselection.

In step 107, when the dedicated priority list is invalid, the terminal stops using the dedicated priority list and deletes the dedicated priority list. The terminal uses the public priority list for cell reselection. Since the priority shown in the public priority list is LTE>UMTS>GERAN, the terminal reselects a cell of the LTE system.

In step 108 (not shown in FIG. 2), when the terminal camps on a cell of the LTE system, the terminal obtains a new dedicated priority list and a valid time of the new dedicated priority list from the network side via a Tracing area (TA) update or a periodical TA update procedure.

In this embodiment, step 103 is optional. In other words, the UMTS or GERAN network side may deliver no public priority list, and the terminal uses the public priority list obtained from the LTE system.

In this embodiment, step 104 is optional. If no indication is delivered in the UMTS or GERAN system broadcast information, the terminal and the network side defaults that the UMTS or GERAN delivers the public priority list in the system broadcast information and the public priority list is usable.

In this embodiment, the terminal performs cell reselection by using the dedicated priority list obtained from the LTE system and the valid time of the dedicated priority list. This is applicable to the case in which the UMTS or GERAN system delivers no dedicated priority list to the terminal. When there is no dedicated priority list, the terminal performs cell reselection by using the public priority list obtained from the LTE system or delivered from the UMTS or GERAN system. In this embodiment, the terminal uses the dedicated priority list obtained from the LTE system for cell reselection so that the non-LTE system may be freed from establishment of the dedicated priority list. Problems in the prior arts that establishment of the dedicated priority list by the non-LTE system causes too much increased signaling and too high costs for network upgrade, are solved.

Embodiment 2

In this embodiment, a terminal camps on a cell of an UMTS or GERAN system, and the UMTS or GERAN system delivers a public priority list. Accordingly, the terminal can only obtain the public priority list from the UMTS or GERAN system broadcast information and stores the public priority list. The terminal cannot obtain a dedicated priority list and a public priority list delivered from the LTE system. The public priority list delivered from the UMTS or GERAN system broadcast information indicates that the priority is LTE>UMTS>GERAN. When the terminal enters into a cell of the LTE system, the LTE system delivers a public priority list in the system broadcast information. The public priority list delivered in the LTE system broadcast information indicates that the priority is LTE>UMTS>GERAN. The dedicated priority list delivered in the LTE system via a dedicated signaling, the dedicated priority list indicates that the priority is GERAN>UMTS>LTE.

When the terminal camps on a cell of the UMTS or GERAN system, the terminal performs cell selection after power-on or move back from a non-coverage area to a coverage area. For example, the terminal camps on a cell of the UMTS or GERAN system before power-off. When the terminal is power-off, information about the cell of the UMTS or GERAN system is stored. When the terminal is power-on, the terminal searches for a cell of the UMTS or GERAN system. When there is a suitable cell in the UMTS or GERAN system, the terminal camps on the suitable cell. Alternatively, when the terminal stores no information about the cell of the UMTS or GERAN system, or when the terminal moves back from a non-coverage area to a coverage area, the terminal selects and camps on a cell of the UMTS or GERAN system after power-on.

A method for cell reselection in embodiment 2 of the invention may include the following steps.

In step 201, a terminal obtains a public priority list from an UMTS or GERAN system broadcast information and stores the priority list.

In step 202, the terminal performs cell reselection according to the above public priority list. Since the priority of the public priority list is LTE>UMTS>GERAN, the terminal reselects a cell of an LTE system.

In step 203, when the terminal enters into a cell of the LTE system, the terminal obtains a dedicated priority list from the network side of the LTE system via a TA update procedure or a periodical TA update procedure or a traffic setup and release procedure. After obtaining the dedicated priority list, the terminal reselects a cell of the GERAN system according to the dedicated priority list.

Those skilled in the art can understand that the subsequent steps 204-208 of this embodiment are similar to steps 104-108 of embodiment 1 after the terminal enters into the cell of the GERAN system. Thus, no repeated description is made here. It is optional whether the UMTS or GERAN delivers an indication in the system broadcast information.

This embodiment differs from the previous embodiment in that: when the terminal camps on the cell of the UMTS or GERAN system; the UMTS or GERAN system delivers no dedicated priority list to the terminal, but may deliver a public priority list to the terminal; the terminal may use the public priority list to reselect a cell of the LTE system; the dedicated priority list delivered from the LTE system may be obtained, and cell reselection may be performed once more.

In this embodiment, the terminal performs cell reselection by using the dedicated priority list obtained from the LTE system and the valid time of the dedicated priority list. This is applicable to the case in which the UMTS or GERAN system delivers no dedicated priority list to the terminal. When there is no dedicated priority list, the terminal performs cell reselection by using the public priority list obtained from the LTE system or delivered from the UMTS or GERAN system. Due to the fact that the terminal performs cell reselection by using the dedicated priority list obtained from the LTE, the non-LTE system may be freed from establishment of the dedicated priority list. Problems in the prior arts that establishment of the dedicated priority list by the non-LTE system causes too much increased signaling and too high costs for network upgrade, are solved.

Embodiment 3

In this embodiment, a terminal camps on a cell of an LTE system. The LTE system may deliver a dedicated priority list via a dedicated signaling and deliver a public priority list in system broadcast information. An UMTS or GERAN system delivers no public priority list. The public priority list delivered in the LTE system broadcast information may indicate a priority as LTE>UMTS>GERAN, and the dedicated priority list deliver via the LTE dedicated signaling may indicate a priority as GERAN>UMTS>LTE.

A method for cell reselection in this embodiment may include the following steps.

In step 301, a terminal camps on a cell of the LTE system. The terminal has obtained a dedicated priority list and a public priority list from the LTE network side, and has stored the two priority lists.

In step 302, after obtaining the priority lists, the terminal performs cell reselection according to the dedicated priority list. Since the dedicated priority list indicates a priority as GERAN>UMTS>LTE, the terminal in the cell of the LTE system reselect and enters into a cell of a GERAN system.

In step 303, the terminal obtains an indication from the UMTS or GERAN system broadcast information.

The above indication is delivered from the UMTS or GERAN network side to the terminal in the system broadcast information, used to indicate that the UMTS or GERAN system delivers no public priority list. Then, the terminal retains the public priority list obtained from the LTE.

In step 304, the above indication notifies the terminal that the UMTS or GERAN will not deliver any usable public priority list, and the terminal retains the public priority list obtained from the LTE.

The indication is not limited to the above contents, and may include some extended contents as follows.

(1) The terminal is notified to perform a periodical search for a cell of the LTE system when the dedicated priority list obtained from the LTE system is invalid and is deleted.

(2) The terminal is notified to perform a cell reselection procedure by using an existing cell reselection criterion when no priority information is stored. In other words, the terminal uses the existing cell reselection criterion which makes measurement and comparison according to a signal quality criterion.

During implementation, a bit included in the indication may be used to determine one of the three contents included in the above indication. Alternatively, three choices may be provided at the same time via two bits included in the indication.

In the above solution, step 303 is a mandatory step. When the terminal learns from the indication that the UMTS or GERAN system will not deliver any available public priority list and the terminal has not stored any public priority list, the terminal may perform subsequent operations according to the extended contents of the above indication.

Steps 305-307 of this embodiment are similar to steps 106-108 of embodiment 1, and thus no repeated description is made here.

In this embodiment, after the terminal enters into a cell of the UMTS or GERAN system, the UMTS or GERAN system will not deliver a public priority list. The terminal performs subsequent actions according to the indication delivered from the UMTS or GERAN system or the public priority list obtained from LTE system and stored at the terminal.

In this embodiment, the terminal performs cell reselection by using the dedicated priority list obtained from the LTE system. Thus, the non-LTE system may be freed from establishment of the dedicated priority list. Problems in the prior arts that establishment of the dedicated priority list by the non-LTE system causes too much increased signaling and too high costs for network upgrade, are solved. Meanwhile, in the case that the terminal receives no public priority list delivered from the non-LTE system, subsequent actions may be performed by using the dedicated priority list obtained from the LTE system or according to the received indication, which improves the flexibility for cell reselection.

Embodiment 4

In this embodiment, a terminal camps on a cell of an UMTS or GERAN system. The UMTS or GERAN system will not deliver a public priority list. An LTE system may deliver a dedicated priority list via a dedicated signaling, and deliver a public priority list in system broadcast information. The public priority list delivered from the LTE system broadcast information indicates a priority as LTE>UMTS>GERAN. The dedicated priority list delivered via the LTE dedicated signaling indicates a priority as GERAN>UMTS>LTE.

A method for cell reselection in this embodiment may include the following steps.

In step 401, a terminal camps on a cell of an UMTS or GERAN system, but the terminal has not obtained a dedicated priority list and a public priority list.

In step 402, the network side of the UMTS or GERAN system delivers an indication to the terminal in system broadcast information.

In step 403, the terminal in the cell of the UMTS or GERAN system obtains the indication from the system broadcast information.

In step 404, the above indication notifies the terminal that the cell of the UMTS or GERAN system has not delivered a public priority list.

Or, the indication notifies the terminal to perform a periodical search for a cell of an LTE system when the dedicated priority list is invalid.

Or, the indication notifies the terminal to perform a cell reselection procedure by using an existing cell reselection criterion when no priority information is stored.

In step 405, the terminal reselects and enters to a cell of an LTE system.

The terminal may reselect a cell of the LTE system by performing a periodical search for the cell of the LTE system. Alternatively, the terminal may reselect the cell of the LTE system by performing a cell reselection procedure using the existing cell reselection criterion.

In step 406, when the terminal camps on a cell of the LTE system, the terminal obtains a dedicated priority list from the network side via a TA update procedure or a periodical TA update procedure or a traffic setup and release procedure, and obtains a public priority list from the network side via system broadcast information. After obtaining the priority list, the terminal performs cell reselection according to the dedicated priority list. Since the dedicated priority list is GERAN>UMTS>LTE, the terminal in the cell of the LTE system reselects and enters into a cell of the UMTS or GERAN system.

The steps subsequent to step 406 are similar to those steps in embodiment 3 performed after the terminal in the cell of the LTE system reselects and enters into a cell of the UMTS or GERAN system. Thus, no repeated description is made here.

This embodiment differs from embodiment 3 in that the terminal camps on a cell of the UMTS or GERAN system, the UMTS or GERAN system will not deliver a public priority list, and the terminal performs subsequent actions according to the indication delivered from the UMTS or GERAN system.

In this embodiment, the terminal performs cell reselection by using the dedicated priority list obtained from the LTE system. Thus, the non-LTE system may be freed from establishment of the dedicated priority list. Problems in the prior arts that establishment of the dedicated priority list by the non-LTE system causes too much increased signaling and too high costs for network upgrade, are solved. Meanwhile, in the case that the terminal receives no public priority list delivered from the non-LTE system, subsequent actions may be performed by using the dedicated priority list obtained from the LTE system or according to the received indication, which improves the flexibility for cell reselection.

In the following embodiments of the cell reselection procedure, for example, the terminal is activated, that is, the terminal is in the connected state. The activated terminal switches to a new cell via the cell reselection procedure.

Embodiment 5

In this embodiment, a terminal camps on a cell of an LTE system and the terminal is activated. The activated terminal switches from the cell of the LTE system to a cell of an UMTS or GERAN system. The LTE system delivers a dedicated priority list via a dedicated signaling, and delivers a public priority list in system broadcast information. The UMTS or GERAN system delivers a public priority list. The public priority list delivered in the UMTS or GERAN system broadcast information indicates a priority as LTE>UMTS>GERAN. The public priority list delivered in the LTE system broadcast information indicates a priority as LTE>UMTS>GERAN. The dedicated priority list delivered in the LTE dedicated signaling indicates a priority as GERAN>UMTS>LTE.

A method for cell reselection according to this embodiment includes the following steps.

In step 501, a terminal activated in a cell of an LTE system obtains a dedicated priority list and a public priority list from the LTE network side, and stores the two priority lists.

During an RRC connection setup procedure, the terminal obtains the dedicated priority list in the following steps. When the terminal performs the RRC connection setup procedure with an eNodeB, upon entry into the RRC connection state, the terminal obtains a new dedicated priority list and releases the old dedicated priority list at the same time.

Alternatively, the terminal may not release the current dedicated priority list after the RRC connection established. Instead, the current dedicated priority list is overlaid with a new dedicated priority list in an RRC connection release message.

In step 502, the terminal switches from the cell of the LTE system to a cell of the UMTS or GERAN system, and releases the RRC connection in the cell of the UMTS or GERAN system.

After the terminal enters into the cell of the UMTS or GERAN system, steps 503-508 to be performed are similar to steps 103-108 of embodiment 1, and thus no repeated description is made here.

In the technical solution according to this embodiment, an activated terminal performs a cell reselection/switch from a cell of the LTE system to a cell of the UMTS or GERAN system. The terminal obtains a dedicated priority list during the RRC connection setup procedure. Or, during the RRC connection setup procedure, the current dedicated priority list is not released, and the current dedicated priority list is overlaid with a new dedicated priority list in the RRC connection release message. The problem in the prior art that the old dedicated priority list is deleted before the terminal obtains a new dedicated priority list, is solved. Meanwhile, in this embodiment, the terminal performs cell reselection by using the dedicated priority list obtained from the LTE system, which may free the non-LTE system from establishment of the dedicated priority list. Problems in the prior arts that establishment of the dedicated priority list by the non-LTE system causes too much increased signaling and too high costs for network upgrade, are solved.

Embodiment 6

Figure 3:
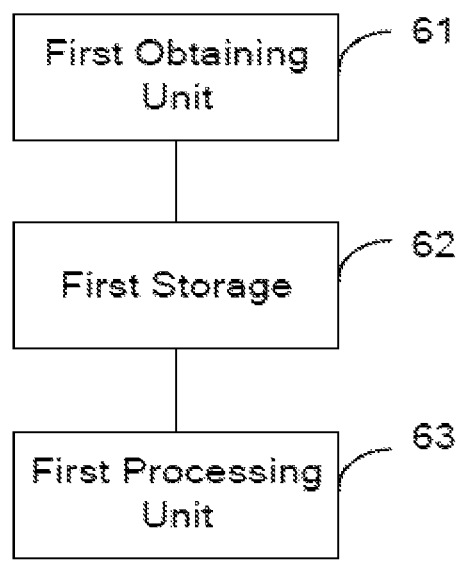
FIG. 3 is a schematic diagram of a terminal provided in embodiment 6 of the present invention.

Referring to FIG. 3, this embodiment provides a terminal capable of performing the methods provided in the embodiments of the invention. The terminal includes:

a first obtaining unit 61 configured to obtain a dedicated priority list from a first system;

a first storage 62 configured to store the dedicated priority list obtained by the first obtaining unit 61; and a first processing unit 63 configured to perform cell reselection according to the dedicated priority list stored in the first storage 62 when the terminal camps on a second system.

Furthermore, the terminal may also includes:

a second obtaining unit configured to obtain a public priority list from the first system and/or the second system; a second storage configured to store the public priority list obtained by the second obtaining unit; and a second processing unit configured to perform cell reselection according to the public priority list stored in the second storage when the terminal camps on the second system and the first storage 62 does not store a valid dedicated priority list.

Furthermore, the terminal may also includes:
a third obtaining unit configured to obtain an indication from the second system;
a third storage configured to store the indication; and
a third processing unit configured to operate according to the indication stored in the third storage.

Further, the first system may be an LTE system and the second system may be a non-LTE system in this embodiment.

Furthermore, an embodiment of the invention provides a system, including a network-side device and a terminal as provided in the above embodiment 6, the network-side device configured to send the dedicated priority list.

Embodiment 7

This embodiment provides a system, including a network-side device and a terminal.

The network-side device is configured to deliver an indication to the terminal, where the indication is used to notify the terminal that the non-LTE system on which the terminal camps will not deliver the public priority list, or notify the terminal to store the public priority list obtained from the LTE system, or notify the terminal to search for a cell of the LTE system when the dedicated priority list stored in the terminal is invalid or search for a cell of the LTE system or perform cell reselection according to a result measured in accordance with a cell signal quality criterion when the terminal does not store the dedicated priority list and the public priority list.

The terminal is configured to receive an indication from the network-side device and perform cell reselection according to the indication.

Embodiment 8

This embodiment provides a system, including a network-side device and a terminal.

The network-side device is within an LTE system, including a first transmission unit configured to transmit a dedicated priority list.

The terminal includes a first storage configured to receive and store the dedicated priority list, and a first processing unit configured to perform cell reselection according to the dedicated priority list when the terminal camps on a cell of a non-LTE system.

In the above embodiments 6-8, the non-LTE system may be a GSM system, an EDGE system, a WCDMA system, a CDMA system, a TD-SCDMA system, or a WIMAX system.

In the above embodiments 6-8, the terminal performs cell reselection by using a dedicated priority list obtained from the first system (for example, an LTE system). Thus, the second system (for example, a non-LTE system) may be freed from establishing the dedicated priority list. Problems in the prior arts that establishment of the dedicated priority list by the various systems causes too much increased signaling and too high costs for network upgrade, are solved.

From the above description to the various embodiments, those skilled in the art may clearly appreciate that the present invention may be implemented by means of software and a necessary general-purpose hardware platform. Alternatively, the present invention may be implemented in hardware. The former case, however, is a more preferred implementation in many cases. Based on this understanding, the technical solution of the present invention in its essence or the features which make a contribution to the prior arts may be embodied in a software product. The computer software product may be stored in a storage media, such as ROM/RAM, magnetic disk, optic disc, etc., including several instructions which cause a computer device (a PC, a server, a network device, or the like) to perform the methods according to the various embodiments of the present invention.

Detailed descriptions have been made above to the invention with reference to some exemplary embodiments, which are not used to limit the present invention. Various changes, equivalent substitutions, and improvements within the principle of the invention are intended to fall within the scope of the invention.

What is claimed is:

1. A method for cell reselection comprising:
obtaining, by a terminal, a dedicated priority list and a valid time of the dedicated priority list from a first communication system, when the terminal is in a cell of the first communication system; and
performing, by the terminal when the terminal camps on a cell of a second communication system, cell reselection in accordance with the obtained dedicated priority list before the valid time expires.

2. The method of claim 1, wherein the first communication system is a Long Term Evolution (LTE) system, and the second communication system is a non-LTE system.

3. The method of claim 1, wherein the terminal obtains the dedicated priority list and the valid time through a dedicated signaling.

4. The method of claim 3, wherein the dedicated signaling is a Radio Resource Control (RRC) Connection Release message.

5. The method of claim 1, wherein after the valid time expires, the method comprises: performing, by the terminal, cell reselection in accordance with a public priority list signaled in system broadcast information.

6. The method of claim 5, wherein the public priority list is obtained by the terminal from the second communication system.

7. The method of claim 1, wherein the valid time is controlled through a timer.

8. The method of claim 1, further comprising: deleting, by the terminal, the dedicated priority list after the valid time expires.

9. The method of claim 1, wherein the dedicated priority list comprises priority information of different radio access technologies (RATs).

10. The method of claim 9, wherein the priority information comprises priority information of frequencies of the different RATs.

11. An apparatus comprising:
a receiver configured to obtain, when a terminal is in a cell of a first communication system, a dedicated priority list and a valid time of the dedicated priority list from the first communication system; and
a processor configured to perform cell reselection when the terminal camps on a cell of a second communication system in accordance with the obtained dedicated priority list before the valid time expires.

12. The apparatus of claim 11, wherein the first communication system is a Long Term Evolution (LTE) system, and the second communication system is a non-LTE system.

13. The apparatus of claim 11 wherein the receiver is configured to obtain the dedicated priority list and the valid time through a dedicated signaling.

14. The apparatus of claim 11, wherein receiver is configured to obtain the dedicated priority list and the valid time through a Radio Resource Control (RRC) Connection Release message.

15. The apparatus of claim 11, wherein after the valid time expires, the processor is configured to perform cell reselection in accordance with a public priority list signaled in system broadcast information.

16. The apparatus of claim 15, wherein the public priority list is obtained by the terminal from the second communication system.

17. The apparatus of claim 11, wherein the valid time is controlled through a timer.

18. The apparatus of claim 11, wherein the processor is further configured to delete the dedicated priority list after the valid time expires.

19. The apparatus of claim 11, wherein the dedicated priority list is configured to comprise priority information of different radio access technologies (RATs).

20. The apparatus of claim 19, wherein the priority information is configured to comprise priority information of frequencies of the different RATs.

21. The method of claim 1, wherein the priority information comprises priority information of frequencies.

22. The apparatus of claim 11, wherein the priority information comprises priority information of frequencies.

23. The method of claim 1, wherein the priority information comprises a frequency priority.

24. The apparatus of claim 11, wherein the priority information comprises frequency priority.

25. A method for cell reselection comprising:

obtaining, by a terminal in a cell of a first communication system, a dedicated priority list and a valid time of the dedicated priority list from the first communication system; and camping, by the terminal, on a cell of a second communication system; and performing, by the terminal, cell reselection in accordance with the obtained dedicated priority list before the valid time expires when the terminal camps.

* * * * *